United States Patent
Muramoto et al.

(10) Patent No.: US 10,915,827 B2
(45) Date of Patent: Feb. 9, 2021

(54) SYSTEM AND METHOD FOR FIELD VALUE RECOMMENDATIONS BASED ON CONFIDENCE LEVELS IN ANALYZED DATASET

(71) Applicant: salesforce.com, inc., San Francisco, CA (US)

(72) Inventors: Kristen Noriko Muramoto, San Francisco, CA (US); Son Thanh Chang, Oakland, CA (US); Clement Jacques Antoine Tussoit, San Francisco, CA (US); Melissa Hoang, San Francisco, CA (US); Chaitanya Malla, Fremont, CA (US); Orjan N. Kjellberg, Walnut Creek, CA (US); Carlos Enrique Mogollan Jimenez, San Francisco, CA (US); George Hu, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 273 days.

(21) Appl. No.: 16/198,449

(22) Filed: Nov. 21, 2018

(65) Prior Publication Data
US 2020/0097846 A1   Mar. 26, 2020

Related U.S. Application Data

(60) Provisional application No. 62/735,813, filed on Sep. 24, 2018.

(51) Int. Cl.
*G06N 5/04* (2006.01)
*G06F 9/451* (2018.01)
(Continued)

(52) U.S. Cl.
CPC ........... *G06N 5/048* (2013.01); *G06F 3/0482* (2013.01); *G06F 3/04847* (2013.01); *G06F 9/451* (2018.02); *G06N 99/00* (2013.01)

(58) Field of Classification Search
CPC ...................................................... G06N 3/006
(Continued)

(56) References Cited

U.S. PATENT DOCUMENTS

| 5,577,188 | A | 11/1996 | Zhu |
| 5,608,872 | A | 3/1997 | Schwartz et al. |

(Continued)

*Primary Examiner* — William D Titcomb
(74) *Attorney, Agent, or Firm* — LKGlobal | Lorenz & Kopf, LLP

(57) ABSTRACT

A method of training a predictive model to predict a likely field value for one or more user selected fields within an application. The method comprises providing a user interface for user selection of the one or more user selected fields within the application; analyzing a pre-existing, user provided data set of objects; training, based on the analysis, the predictive model; determining, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and providing a user interface for user review of the confidence functions for user selection of confidence threshold levels to be used with the predictive model.

20 Claims, 8 Drawing Sheets

(51) Int. Cl.
  *G06N 99/00* (2019.01)
  *G06F 3/0484* (2013.01)
  *G06F 3/0482* (2013.01)

(58) Field of Classification Search
  USPC .......................................................... 706/11
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,599,885 B2 * | 3/2020 | Galitsky ............... G06F 40/216 |
| 10,769,419 B2 * | 9/2020 | Rodriguez Bravo ....................... G06K 9/00892 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |

(56) References Cited

U.S. PATENT DOCUMENTS

| | | |
|---|---|---|
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0357221 A1* | 12/2018 | Galitsky ............... G06F 40/205 |
| 2019/0102452 A1* | 4/2019 | Dayan ................... G06F 16/285 |
| 2019/0180737 A1* | 6/2019 | Abuelsaad .............. G10L 15/19 |
| 2019/0236155 A1* | 8/2019 | Bachrach ............ G06F 16/3329 |
| 2019/0251165 A1* | 8/2019 | Bachrach ................ G06F 40/30 |
| 2019/0379699 A1* | 12/2019 | Katragadda ............ G06N 3/006 |
| 2020/0034749 A1* | 1/2020 | Kumar ................... G06F 16/93 |

* cited by examiner

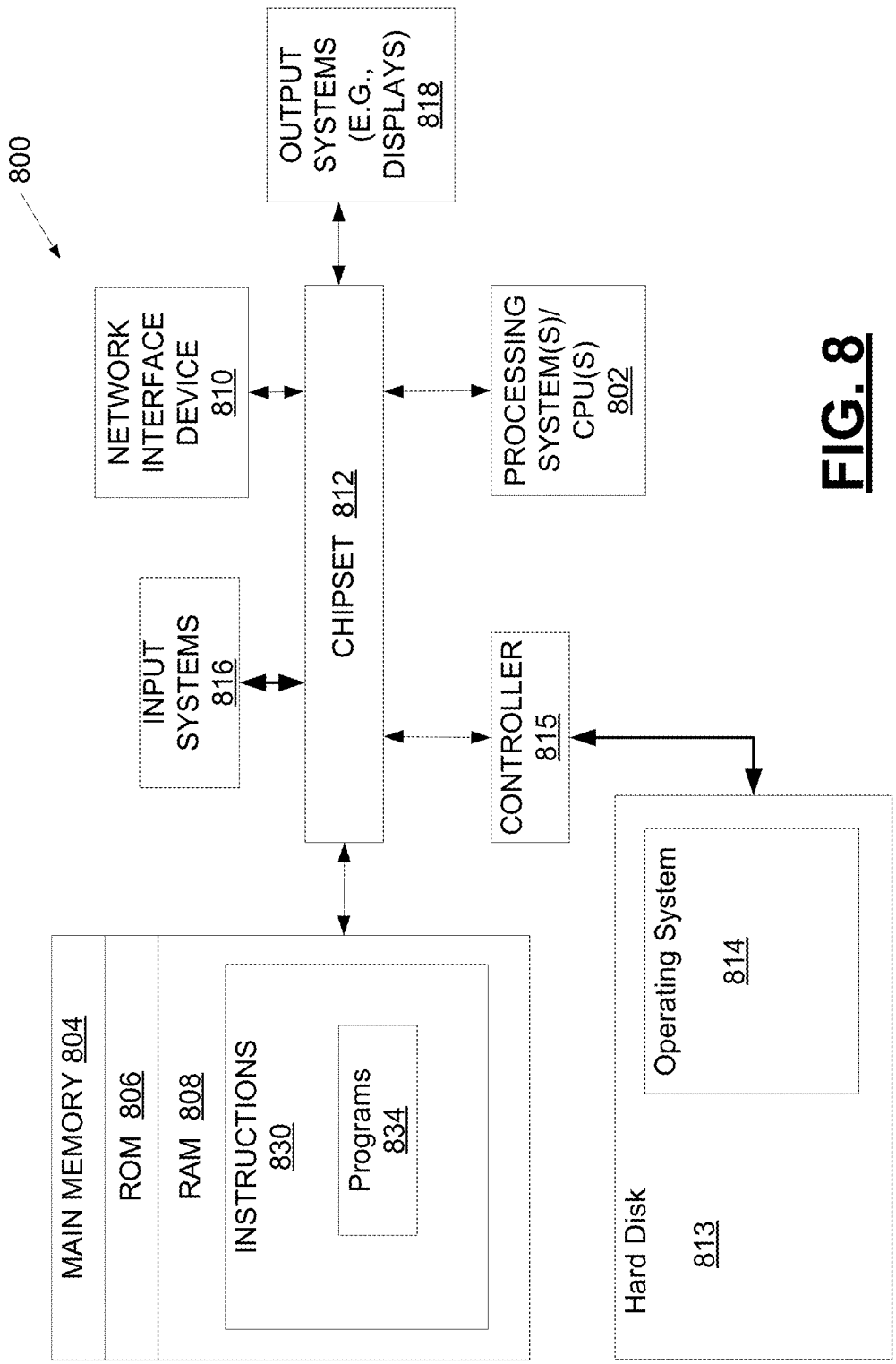

SYSTEM AND METHOD FOR FIELD VALUE RECOMMENDATIONS BASED ON CONFIDENCE LEVELS IN ANALYZED DATASET

CROSS-REFERENCE TO RELATED APPLICATION

This application claims the benefit of U.S. Provisional Application No. 62/735,813 filed Sep. 24, 2018, and incorporates this prior application into the present application by reference.

TECHNICAL FIELD

Embodiments of the subject matter described herein relate generally to computer systems, and more particularly to the prediction of field values for fields in a form on a computer system.

BACKGROUND

Many forms are filled out via computer systems. The forms may be configured to capture information about some other document, file, observation, and others. The forms may exist on computer systems and may be generated by application programs on a computer system. A system that could analyze the document, file, observation, etc. that the form is configured to capture information regarding would be advantageous and could improve production.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 is a schematic block diagram of an example computer system that can be used to implement the techniques and methods described herein, in accordance with some embodiments.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Disclosed herein are systems, apparatus, methods and techniques for predicting field values for preselected fields based on confidence levels in an analyzed dataset. In one example, a predictive model is trained using a pre-existing data set to predict field values for preselected fields from objects contained in the data set. A confidence function is calculated for the preselected fields. A user is provided an option to review the confidence function. The user is provided the option to select a proposed confidence threshold level that is based on the confidence function or to select a different confidence threshold level after reviewing the confidence function. In operation with a new object, the predictive model may predict field values for the preselected fields and a confidence level for the predictions. When a prediction has a confidence level that meets or exceeds a confidence level threshold, the predictive model may designate the prediction as a recommended field value.

Figure 1:
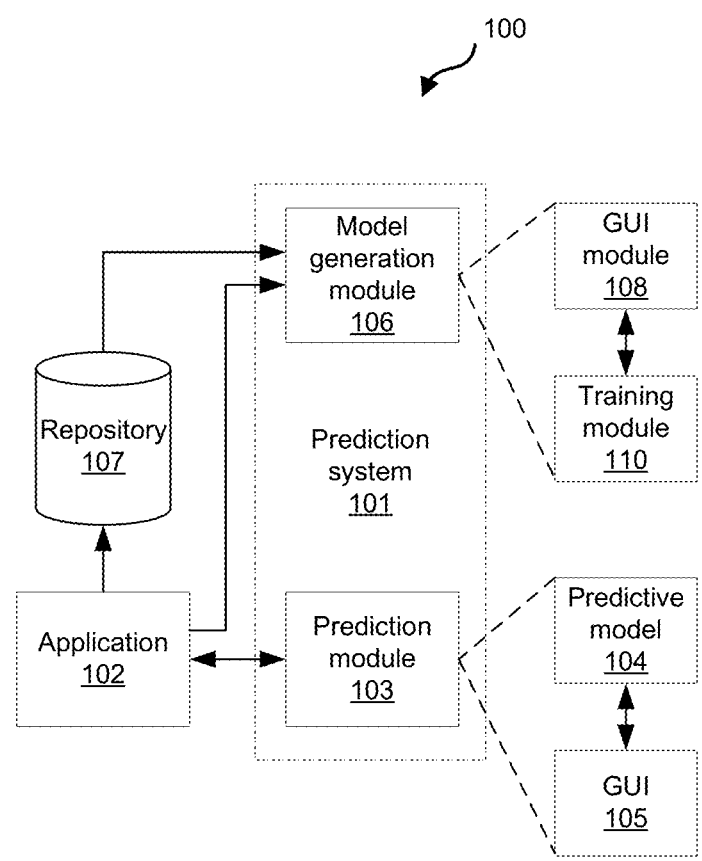
FIG. 1 is a block diagram depicting an example computing environment that can be used to implement aspects of the current subject matter, in accordance with some embodiments.

FIG. 1 is a block diagram depicting an example computing system 100 that can implement aspects of the described systems, apparatus, methods and techniques. The example computing system 100 includes a prediction system 101 and an application 102 such as a customer relationship management (CRM) application. The example CRM application 102 is configured for use in creating a form that can be used to capture information regarding customer objects and contacts. An object may be any number of data items such as an object from a customer, an object about a customer, and others. The example CRM application 102 is connected to a repository 107 containing a pre-existing, user provided data set of objects.

The example prediction system 101 includes a prediction module 103 and a model generation module 106. The example prediction module 103 includes a predictive model 104 and a GUI module 105. The example predictive model 104 is configured to analyze a new object received by the example CRM application 102, predict a likely field value for one or more user selected fields within the form generated by the example CRM application 102 based on the object analysis, provide the predicted field values to the example CRM application 102, and calculate a predicted confidence level for each predicted field value. The example model generation module 106 is configured to train the predictive model 104 using machine learning techniques and in accordance with user selected preferences.

The example prediction system 101 is implemented by a controller. The controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in implementing the example prediction system 101.

The instructions may include one or more separate programs, each of which comprises an ordered listing of executable instructions for implementing logical functions. The instructions, when executed by the processor, receive and process data, perform logic, calculations, methods and/or algorithms for implementing the example prediction system 101.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

The example model generation module 106 includes a GUI module 108 and a training module 110. The example GUI module 108 is configured to provide a user interface for user selection of options for operation of the prediction module 103. The example training module 110 is configured to train the predictive model 104 using reinforced learning and/or other machine learning techniques.

The example GUI module 108 is configured to provide a user interface for user selection of the one or more user selected fields within the example CRM application 102. The user is provided a user interface that allows the user to indicate a desire to select one or more fields within the example CRM application for which predicted field values will be provided.

Figure 2:
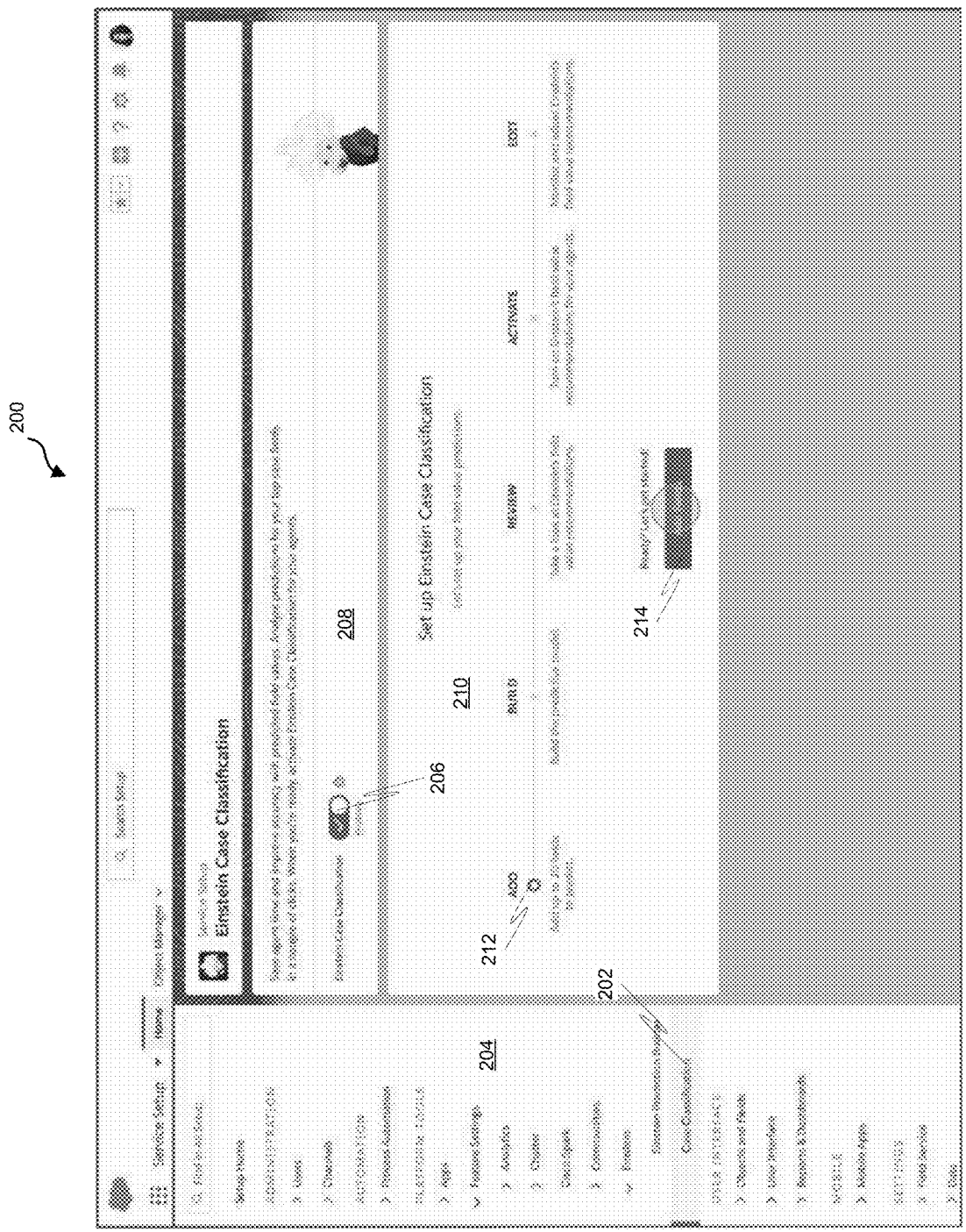
FIG. 2 is a diagram depicting an example screenshot of a graphical user interface (GUI) that illustrates user selection features provided by an example model generation module, in accordance with some embodiments.

Depicted in FIG. 2 is an example screenshot of a graphical user interface (GUI) 200 that illustrates user selection features provided by an example GUI module 108 in an example model generation module 106. In this example, the GUI 200 includes a clickable Case Classification selection link 202 in a left pane 204, a case classification slider switch widget 206 in an upper center pane 208, and, in a central center pane 210, an ADD indicator widget 212 and an Add Fields button widget 214. Through user selection of the Case Classification selection link 202, case classification slider switch widget 206, and the Add Fields button widget 214, a user can indicate, to the example model generation module 106, a desire to select one or more fields within a CRM application for which predicted field values will be provided.

Figure 3:
FIG. 3 is a diagram depicting another example screenshot of a GUI that illustrates user selection features provided by an example model generation module, in accordance with some embodiments.

Depicted in FIG. 3 is another example screenshot of a GUI 300 that illustrates user selection features provided by an example GUI module 108 in an example model generation module 106. In this example, the GUI 300 includes a listing of fields 302 that are selectable by a user for which predicted field values may be provided. A language field 304 is selected in this example, and is an example of a field that can be selected by default by the example model generation module 106 and unselected by user choice. A Case Reason field 306 is in focus and is an example of a field that is not selected by default by the example model generation module 106 but can be selected by the user.

Figure 4:
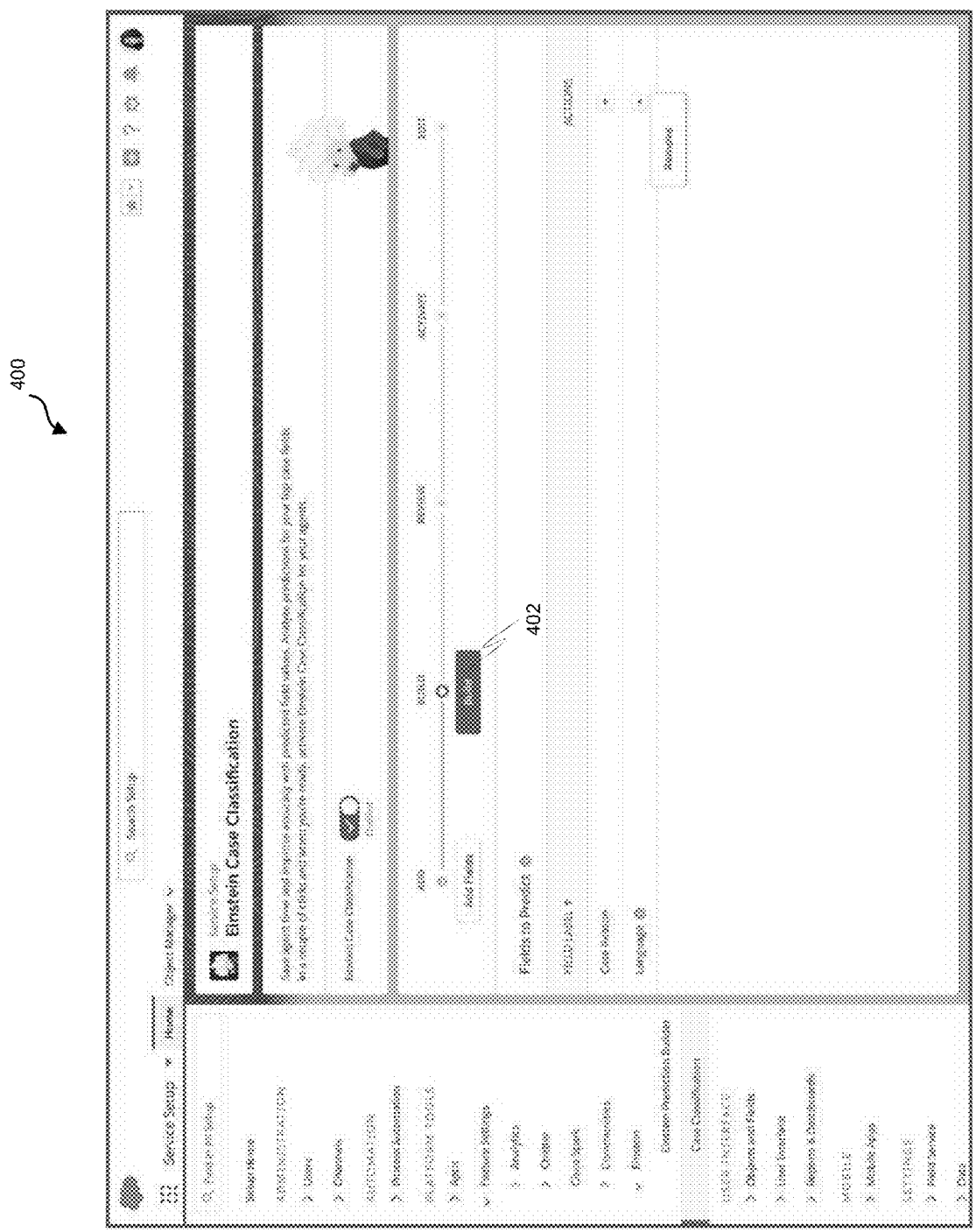
FIG. 4 is a diagram depicting another example screenshot of a GUI that illustrates user selection features provided by an example model generation module, in accordance with some embodiments.

The example training module 110 in the example model generation module 106 is configured to train the prediction model 104 after user selection of fields for prediction. Depicted in FIG. 4 is another example screenshot of a GUI 400 that illustrates user selection features provided by an example GUI module 108 in an example model generation module 106. In this example, the GUI 400 includes a user selectable build button 402 that allows a user to instruct the example training module 110 to train a predictive model 104 for predicting field values for the user selected fields. To train the predictive model 104, the example training module 110 is configured to analyze the pre-existing, user provided data set of objects in the repository 107 for relationships between the user selected fields and content in the objects in the data set (e.g., content in the title and body of message objects). The example training module 106 is configured to train, based on the analysis, the predictive model 104 to predict field values and a confidence level for the prediction.

During the training phase, the example training module 110 is also configured to determine, for each user selected field based on the analysis, a confidence function for the predictive model 104. The example training module 110 is configured to determine the confidence function by testing the accuracy of predictions from the predictive model 104. The example confidence function identifies the percentage of field values for a field that were predicted correctly by the trained predictive model 104 at different applied confidence levels, the percentage of field values for the field that were predicted incorrectly by the trained predictive model 104 at different applied confidence levels, and the percentage of cases for a field in which the trained predictive model 104 could not provide a prediction at different applied confidence levels.

Figure 5:
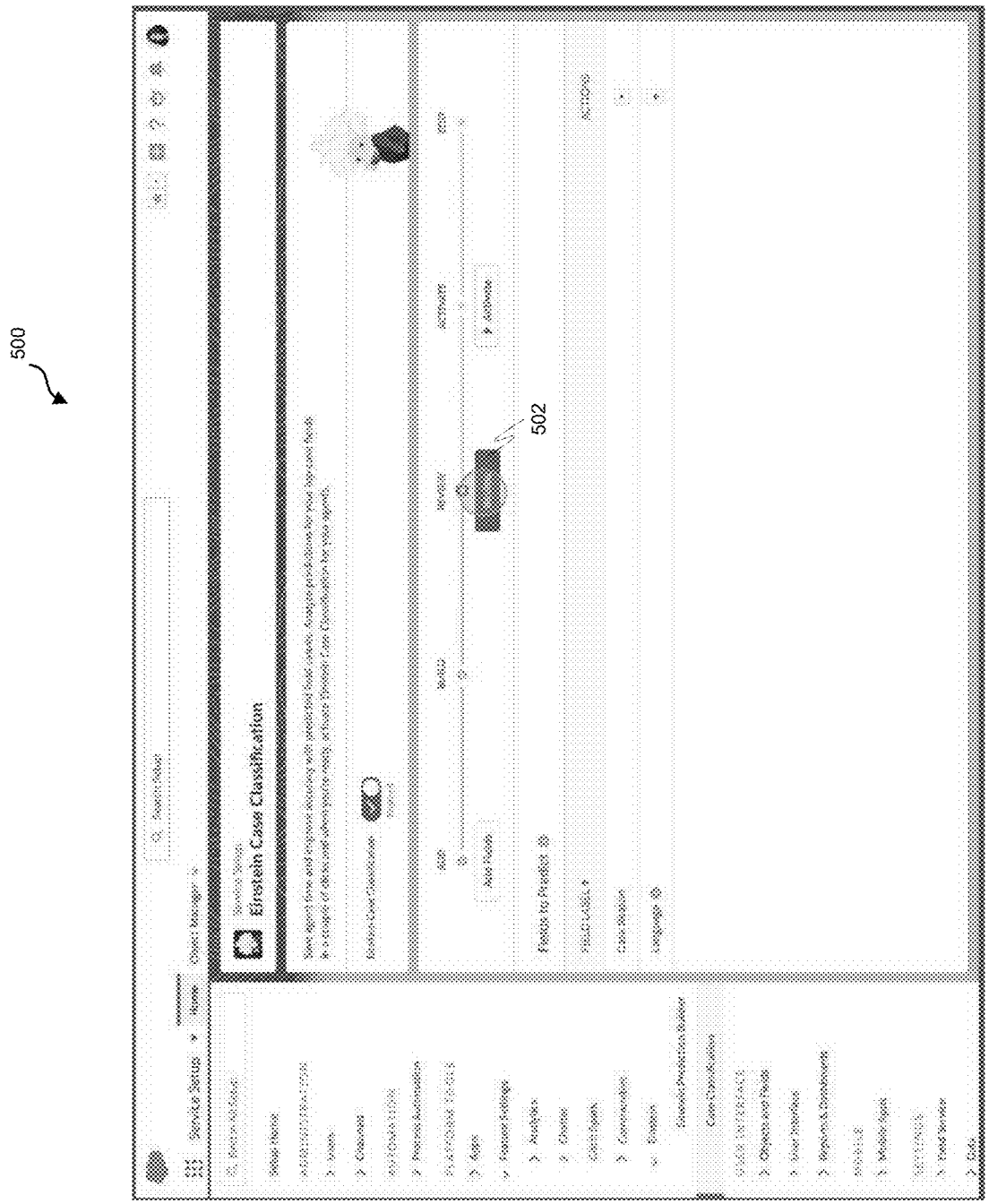
FIG. 5 is a diagram depicting another example screenshot of a GUI that illustrates user selection features provided by the example model generation module, in accordance with some embodiments.

The example GUI module 108 is configured to provide a user interface for user review of the confidence function for a user selected field and for user selection of a confidence threshold level to be used with the predictive model 104 for the user selected field. Depicted in FIG. 5 is an example screenshot of a GUI 500 that illustrates user selection features provided by the example model generation module 106. In this example, the GUI 500 includes a user selectable Review button 502 that allows a user to instruct the example model generation module 106 to allow the user to review the confidence function for a user selected field and to select a confidence threshold level to be used with the predicting model 104 for the user selected field.

Figure 6:
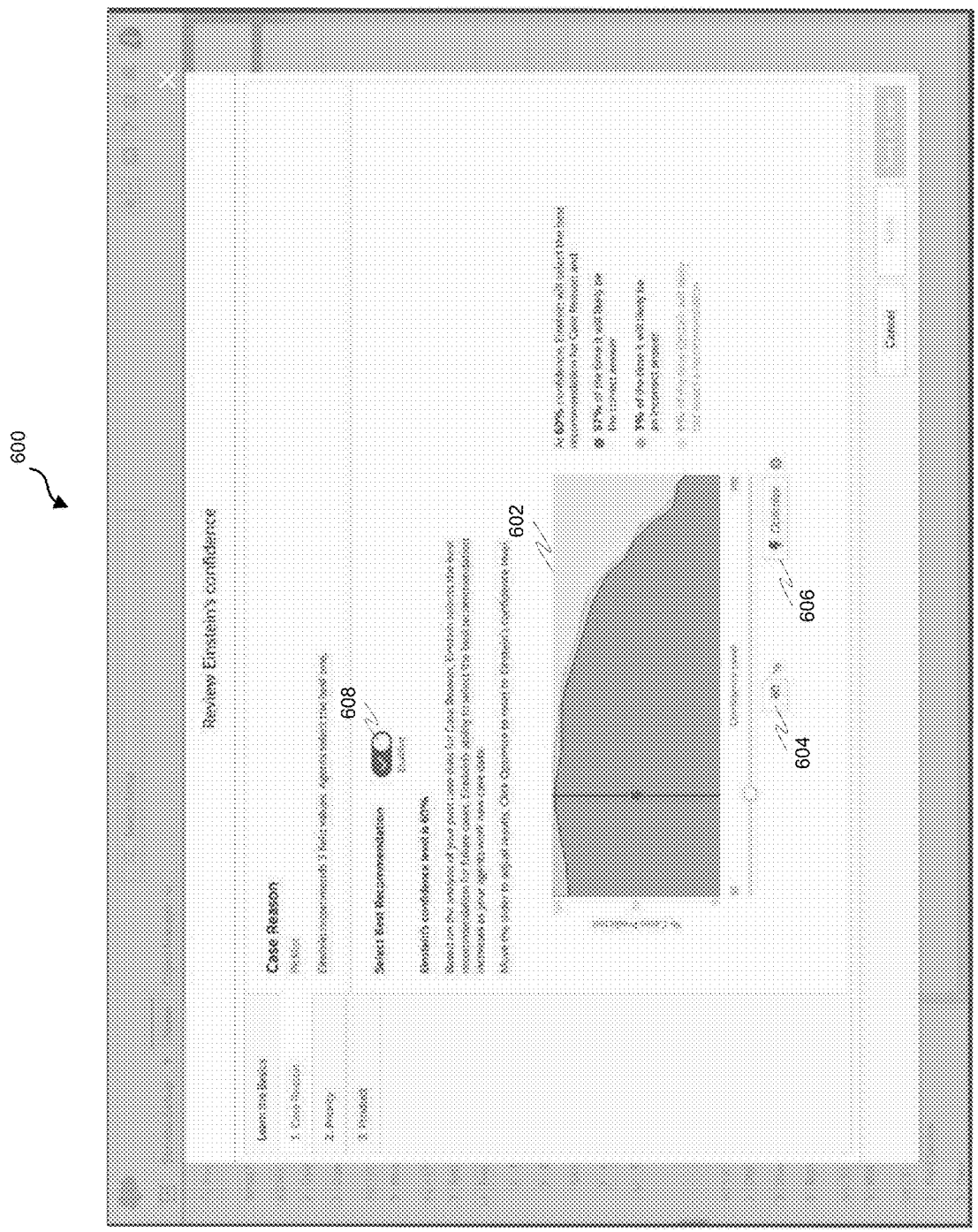
FIG. 6 is a diagram depicting an example screenshot of a GUI provided by the example model generation module that allows a user to review the confidence function for a user selected field and allows user selection of a confidence threshold level to be used with the predictive model for the user selected field, in accordance with some embodiments.

Depicted in FIG. 6 is an example screenshot of a GUI 600 provided by the example model generation module 106 that allows a user to review the confidence function 602 for a user selected field and allows user selection of a confidence threshold level 604 to be used with the predictive model 104 for the user selected field. In this example, at a 60% confidence level the predictive model 104 is expected to correctly predict the field value for the user selected field 97% of the time based on the performance of the predictive model on the training data set. At the 60% confidence level, the predictive model 104 is expected to incorrectly predict the field value for the user selected field 3% of the time based on the performance of the predictive model on the training data set. At the 60% confidence level, the predictive model 104 is expected to not provide a prediction at different applied confidence levels 0% of the time based on the performance of the predictive model on the training data set. The example model generation module 106 is configured to select an optimal confidence threshold level and allow the user to alter the selection. In the example of FIG. 6, the example model generation module 106 has selected 60% as the optimal confidence threshold level but provides an option through a text entry box 604 for the user to choose a different confidence threshold level. Also, in this example, the example model generation module 106 has provided an optimize button widget 606 that allows a user to instruct the example model generation module 106 to set the confidence threshold level to the optimal confidence threshold level.

The example model generation module 106 is also configured to provide, for user selection via the user interface, an option for the predictive model 104 to identify a predicted field value as a best recommendation. Also depicted in FIG. 6 is a Select Best Recommendation toggle button widget 608 for user selection. The confidence threshold level is used to determine the best recommendation, wherein predicted field values determined by the predictive model 104 that have an associated confidence level that is below the confidence threshold level will not be recommended as a best recommendation. Predicted field values determined by the predictive model 104 that have an associated confidence level that is equal to or above the confidence threshold level will be recommended by the predictive model 104 as a best recommendation via a visual indication, when the Select Best Recommendation option is enabled. The model generation module 106 is also configured to provide an option, for user selection via the user interface, for the predictive model 104 to automatically apply the best recommendation as a field value without user confirmation of the application of the best recommendation as a field value.

The example model generation module 106 is configured to provide an option, via the user interface, to activate the prediction module 103 for use with the example CRM application 102. As an example, as depicted in the example of FIG. 5, an activate budget widget can be provided for user selection to activate the prediction module 103 for use with the example CRM application 102.

When activated for use with the example CRM application 102 and the example CRM application 102 receives a new object, the example prediction module 103 is configured to provide a user option via a user interface provided by the example GUI module 105 to select to receive predicted field values for the user selected fields. When the user option has been selected, the example predictive model 104 is configured to predict field values for the user selected fields based on content in the new object and the example GUI module 105 is configured to automatically enter predicted field values in user selected fields or present the user with predicted field value options for selection depending on prior user selection.

Figure 7:
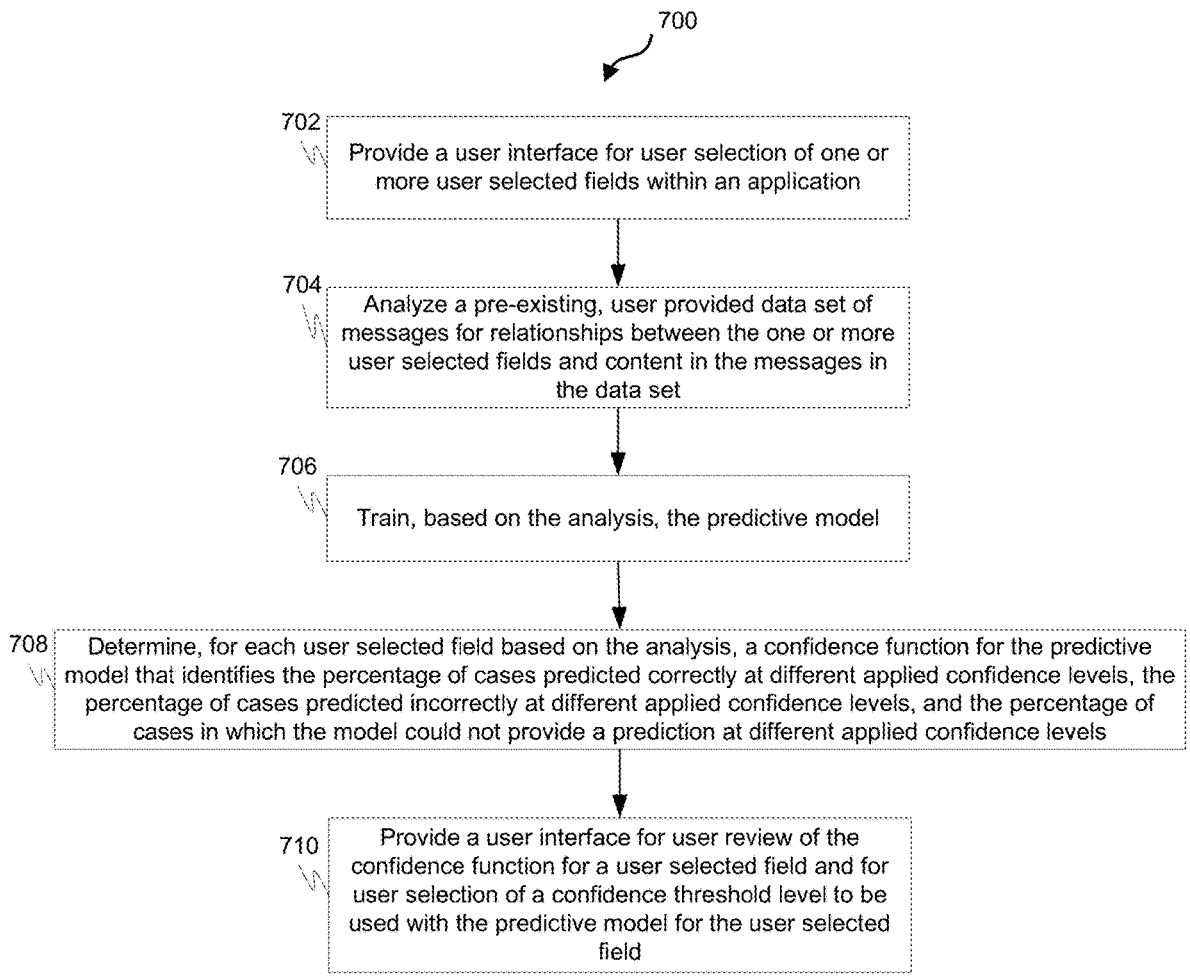
FIG. 7 is a process flow chart depicting an example process for training a predictive model in a prediction module to predict a likely field value for one or more user selected fields within a CRM application, in accordance with some embodiments.

FIG. 7 is a process flow chart depicting an example process 700 for training a predictive model 104 in a prediction module 103 to predict a likely field value for one or more user selected fields within a CRM application. The order of operation within the example process 700 is not limited to the sequential execution as illustrated in the figure, but may be performed in one or more varying orders as applicable and in accordance with the present disclosure.

The example process 700 includes providing a user interface for user selection of the one or more user selected fields within the example CRM application (operation 702). This may be provided via a graphical user interface module 108 in a model generation module 106.

The example process 700 includes analyzing a pre-existing, user provided data set of objects for relationships between the one or more user selected fields and content in the objects in the data set (e.g., content in the title and body of message objects) (operation 704). This may be performed via a training module 110 in a model generation module 106.

The example process 700 includes training, based on the analysis, the predictive model (operation 706). This may be performed via a training module 110 in a model generation module 106.

The example process 700 includes determining, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels (operation 708). This may be performed via a training module 110 in a model generation module 106.

The example process 700 includes providing a user interface for user review of the confidence function for a user selected field and for user selection of a confidence threshold level to be used with the predictive model for the user selected field (operation 710). This may be performed via a GUI module 108 in a model generation module 106.

FIG. 8 is a schematic block diagram of an example computer system that can be used to implement the techniques and methods described herein. The example computer system can include one or more processing system(s) 802, main memory 804, a network interface device (NID) 810, a chipset 812, a hard disk 813 and hard disk controller 815, input systems 816, and output systems 818.

The chipset 812 is usually located on a motherboard and is a set of electronic components (e.g., in an integrated circuit) that interconnects and manages the data flow between the processing system(s) 802 and other elements of the computer system and connected peripherals. For instance, the chipset 812 provides an interface between the processing system(s) 802 and the main memory 804, and also includes functionality for providing network connectivity through the NID 810, such as a gigabit Ethernet adapter. The chipset 812 typically contains the processor bus interface (also known as a front-side bus), memory controllers, bus controllers, I/O controllers, etc.

Processing system(s) 802 represents one or more general-purpose processing devices such as a microprocessor, central processing unit, or the like. More particularly, the processing system(s) 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 802 may also be one or more special-purpose processing devices such as an application specific integrated circuit (ASIC), a field programmable gate array (FPGA), a digital signal processor (DSP), network processor, or the like.

The processing system(s) 802 can include one or more central processing units (CPUs) that operate in conjunction with the chipset 812. The processing system(s) 802 perform arithmetic and logical operations necessary for the operation of the example computer system.

The NID 810 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 816 (or input device(s)) allow a user to input information to the computer system and can include things such as a keyboard, a mouse or other cursor pointing device, a pen, a voice input device, a touch input device, a webcam device, a microphone, etc. Output system(s) 818 (or output device(s)) present information to the user of the computer system and can include things such as a display, monitor, speakers, or the like.

The chipset 812 can provide an interface to various forms of computer-readable storage media including a main memory 804 (e.g., read-only memory (ROM), flash memory, dynamic random access memory (DRAM) such as synchronous DRAM (SDRAM)), and hard disk 813. The processing system(s) 802 can communicate with the various forms of computer-readable storage media via the chipset 812 and appropriate buses.

A hard disk 813 is a form of non-volatile memory that can store an operating system (OS) 814. The operating system 814 is software that is copied into RAM and executed by the processing system(s) 802 to control the operation of the example computer system, manage computer hardware and software resources, and provide common services for computer programs executed by the processing system(s) 802. Regardless of the implementation, the operating system 814 includes many different "components" that make the different parts of the example computer system work together. The disk controller 815 is the controller circuit which enables the processing system 802 to communicate with a hard disk 813, and provides an interface between the hard disk 813 and the bus connecting it to the rest of the system.

The main memory 804 may be composed of many different types of memory components. The main memory 804 can include non-volatile memory (such as read-only memory (ROM) 806, flash memory, etc.), volatile memory (such as random access memory (RAM) 808), or some combination of the two. The RAM 808 can be any type of suitable random access memory including the various types of dynamic random access memory (DRAM) such as SDRAM, the various types of static RAM (SRAM). The main memory 804 (as well as the processing system(s) 802) may be distributed throughout the example computer system.

The ROM 806 of the main memory 804 can be used to store firmware that includes program code containing the basic routines that help to start up the example computer system and to transfer information between elements within the example computer system. The ROM of the main memory 804 may also store other software components necessary for the operation of the example computer system.

The RAM 808 stores programs/instructions 830 or executable code for one or more programs 834 that can be loaded and executed at processing system(s) 802 to perform various functions. The programs/instructions 830 are computer readable program code that can be stored in RAM 808 (or other a non-transitory computer readable medium of the example computer system) that can be read and executed by processing system(s) 802 to perform various acts, tasks, functions, and steps as described herein. The methods and techniques described herein can be captured in programming instructions 830 for execution by the processing system 802 to cause the example computer system to perform the described methods, processes, and techniques.

In one embodiment, a prediction system is provided. The prediction system is configured to offer recommended field values based on an analyzed data set. The prediction system comprises a processor configured by programming instructions encoded in non-transient computer readable media. The prediction system is configurable to: provide a user interface for user selection of one or more fields within an application for which to automatically predict a field value; analyze a user provided data set of objects for relationships between the user selected one or more fields and content in the objects in the data set; train, based on the analysis, a predictive model configured to predict a likely field value for each of the user selected one or more fields when the application receives a new object and further configured to calculate a predicted confidence level for each predicted likely field value; determine, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; provide a user interface for user review of the confidence function for a user selected field and for user selection of a confidence threshold level to be used with the predictive model for the user selected field; and analyze an object received by the application using the predictive model and provide to the application predicted field values for user selected based on the confidence threshold level.

These aspects and other embodiments may include one or more of the following features. The application may provide user-selectable field value choices for the fields and wherein the user-selectable field value choices are selected via a picklist, lookup or checkbox. The model generation module may be configured to provide, for user selection via the user interface, an option for the predictive model to identify a predicted field value as a best recommendation. The confidence threshold level may be used to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication. The model generation module may be configured to provide an option, for user selection via the user interface, for the predictive model to automatically apply the best recommendation as a field value without user confirmation of the application of the best recommendation as a field value. The model generation module may be configured to recommend the confidence threshold level. The model generation module may be configured to provide an option, via the user interface, to activate the predictive model for use with the application.

In another embodiment, a computing system is provided. The computing system comprises an application configured for use in analyzing customer objects; a predictive model configurable to analyze an object received by the application, predict a likely field value for one or more user selected fields within the application based on the object analysis, provide the predicted field values to the application, and calculate a predicted confidence level for each predicted field value; and a model generation module. The model generation module is configured to: provide a user interface for user selection of the one or more user selected fields within the application; analyze a pre-existing, user provided data set of objects for relationships between the one or more user selected fields and content in the objects in the data set (e.g., content in the title and body of message objects); train, based on the analysis, the predictive model; determine, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and provide a user interface for user review of the confidence function for a user selected field and for user selection of a confidence threshold level to be used with the predictive model for the user selected field.

These aspects and other embodiments may include one or more of the following features. The application may provide user-selectable field value choices for the fields and wherein the user-selectable field value choices are selected via a picklist, lookup or checkbox. The model generation module may be configured to provide, for user selection via the user interface, an option for the predictive model to identify a predicted field value as a best recommendation. The confidence threshold level may be used to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication. The model generation module may be configured to provide an option, for user selection via the user interface, for the predictive model to automatically apply the best recommendation as a field value without user confirmation of the application of the best recommendation as a field value. The model generation module may be configured to recommend the confidence threshold level. The model generation module may be configured to provide an option, via the user interface, to activate the predictive model for use with the application.

In another embodiment, a method of training a predictive model to predict a likely field value for one or more user selected fields within an application is provided. The method comprises: providing a user interface for user selection of the one or more user selected fields within the application; analyzing a pre-existing, user provided data set of objects for relationships between the one or more user selected fields and content in the objects in the data set (e.g., content in the title and body of message objects); training, based on the analysis, the predictive model; determining, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and providing a user interface for user review of the confidence function for a user selected field and for user selection of a confidence threshold level to be used with the predictive model for the user selected field.

These aspects and other embodiments may include one or more of the following features. The method may further comprise providing, for user selection via the user interface, an option for the predictive model to identify a predicted field value as a best recommendation. The method may further comprise applying the confidence threshold level to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication. The method may further comprise providing an option, for user selection via the user interface, for the predictive model to automatically apply the best recommendation as a field value without user confirmation of the application of the best recommendation as a field value. The method may further comprise automatically recommending the confidence threshold level. The method may further comprise providing an option, via the user interface, to activate the predictive model for use with the application.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A prediction system configured to offer recommended field values based on an analyzed data set, the case prediction system comprising a processor configured by programming instructions encoded in non-transient computer readable media, the prediction system configurable to:
   provide a user interface for user selection of one or more fields within an application for which to automatically predict a field value;
   analyze a user provided data set of objects for relationships between the user selected one or more fields and content in the objects in the data set;
   train, based on the analysis, a predictive model configurable to predict a likely field value for each of the user selected one or more fields when the application receives a new object and further configured to calculate a predicted confidence level for each predicted likely field value;
   determine, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels;
   provide a user interface for user review of the confidence function for a user selected field and for user selection of a confidence threshold level to be used with the predictive model for the user selected field; and
   analyze an object received by the application using the predictive model and provide to the application predicted field values for user selected fields based on the user selected confidence threshold level.

2. The prediction system of claim 1, wherein the application provides user-selectable field value choices for the fields and wherein the user-selectable field value choices are selected via a picklist, lookup or checkbox.

3. The prediction system of claim 1, further configured to provide, for user selection via the user interface, an option for the predictive model to identify a predicted field value as a best recommendation.

4. The prediction system of claim 3, wherein the confidence threshold level is used to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication.

5. The prediction system of claim 3, further configured to provide an option, for user selection via the user interface, for the predictive model to automatically apply the best recommendation as a field value without user confirmation of the application of the best recommendation as a field value.

6. The prediction system of claim 1, further configured to recommend the confidence threshold level.

7. The prediction system of claim 1, further configured to provide an option, via the user interface, to activate the predictive model for use with the application.

8. A computing system comprising:
   an application configurable for use in analyzing customer objects;
   a predictive model configurable to analyze an object received by the application, predict a likely field value for one or more user selected fields within the application based on the object analysis, provide the predicted field values to the application, and calculate a predicted confidence level for each predicted field value; and
   a model generation module configurable to:
      provide a user interface for user selection of the one or more user selected fields within the application;
      analyze a pre-existing, user provided data set of objects for relationships between the one or more user selected fields and content in the objects in the data set;
      train, based on the analysis, the predictive model;
      determine, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and
      provide a user interface for user review of the confidence function for a user selected field and for user selection of a confidence threshold level to be used with the predictive model for the user selected field.

9. The computing system of claim 8, wherein the application provides user-selectable field value choices for the fields and wherein the user-selectable field value choices are selected via a picklist, lookup or checkbox.

10. The computing system of claim 8, wherein the model generation module is configured to provide, for user selection via the user interface, an option for the predictive model to identify a predicted field value as a best recommendation.

11. The computing system of claim 10, wherein the confidence threshold level is used to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication.

12. The computing system of claim 10, wherein the model generation module is configured to provide an option, for user selection via the user interface, for the predictive model to automatically apply the best recommendation as a field value without user confirmation of the application of the best recommendation as a field value.

13. The computing system of claim 8, wherein the model generation module is configured to recommend the confidence threshold level.

14. The computing system of claim 8, wherein the model generation module is configured to provide an option, via the user interface, to activate the predictive model for use with the application.

15. A method of training a predictive model to predict a likely field value for one or more user selected fields within an application, the method comprising:
   providing a user interface for user selection of the one or more user selected fields within the application;
   analyzing a pre-existing, user provided data set of objects for relationships between the one or more user selected fields and content in the objects in the data set;
   training, based on the analysis, the predictive model;
   determining, for each user selected field based on the analysis, a confidence function for the predictive model that identifies the percentage of cases predicted correctly at different applied confidence levels, the percentage of cases predicted incorrectly at different applied confidence levels, and the percentage of cases in which the prediction model could not provide a prediction at different applied confidence levels; and
   providing a user interface for user review of the confidence function for a user selected field and for user selection of a confidence threshold level to be used with the predictive model for the user selected field.

16. The method of claim 15, further comprising providing, for user selection via the user interface, an option for the predictive model to identify a predicted field value as a best recommendation.

17. The method of claim 16, further comprising applying the confidence threshold level to determine the best recommendation, wherein predicted field values determined by the predictive model that have an associated confidence level that is below the confidence threshold level will not be recommended as a best recommendation and predicted field values determined by the predictive model that have an associated confidence level that is equal to or above the confidence threshold level will be recommended by the predictive model as a best recommendation via a visual indication.

18. The method of claim 16, further comprising providing an option, for user selection via the user interface, for the predictive model to automatically apply the best recommendation as a field value without user confirmation of the application of the best recommendation as a field value.

19. The method of claim 15, further comprising automatically recommending the confidence threshold level.

20. The method of claim 15, further comprising providing an option, via the user interface, to activate the predictive model for use with the application.

* * * * *